(12) United States Patent
Fisher et al.

(10) Patent No.: US 10,816,106 B2
(45) Date of Patent: Oct. 27, 2020

(54) CARTRIDGE TEMPERATURE LIMIT CONTROL MECHANISM

(71) Applicant: Masco Canada Limited, St. Thomas (CA)

(72) Inventors: Bryan Todd Fisher, Appin (CA); Jeffrey J. Gibson, London (CA); Brian David Main, Woodstock (CA)

(73) Assignee: Masco Canada Limited (CA)

( * ) Notice: Subject to any disclaimer, the term of this patent is extended or adjusted under 35 U.S.C. 154(b) by 1620 days.

(21) Appl. No.: 14/580,778

(22) Filed: Dec. 23, 2014

(65) Prior Publication Data
US 2016/0179108 A1 Jun. 23, 2016

(51) Int. Cl.
*G05D 23/13* (2006.01)
*F16K 31/60* (2006.01)

(52) U.S. Cl.
CPC .......... *F16K 31/605* (2013.01); *F16K 31/607* (2013.01); *G05D 23/1346* (2013.01)

(58) Field of Classification Search
CPC ... F16K 31/605; F16K 31/607; G05D 23/132; G05D 23/1326; G05D 23/1333; G05D 23/134; G05D 23/1346
See application file for complete search history.

(56) References Cited

U.S. PATENT DOCUMENTS

| | | | |
|---|---|---|---|
| 4,941,509 A * | 7/1990 | Orlandi | F16K 11/0787 137/625.17 |
| 5,340,018 A | 8/1994 | MacDonald | |
| 5,551,124 A | 9/1996 | Zeringue | |
| 5,671,904 A | 9/1997 | Minutillo | |
| 5,779,139 A | 7/1998 | Ueno | |
| 6,079,625 A | 6/2000 | Lebkuchner | |
| 6,085,984 A | 7/2000 | Chamot et al. | |
| 6,170,523 B1 * | 1/2001 | Chang | F16K 11/0787 137/625.17 |
| 6,250,559 B1 | 6/2001 | Knauss | |
| 6,315,210 B1 * | 11/2001 | Kline | G05D 23/134 236/12.2 |

(Continued)

FOREIGN PATENT DOCUMENTS

FR 2665500 A1 * 2/1992 .......... F16K 11/0782

*Primary Examiner* — Jianying C Atkisson
*Assistant Examiner* — Meraj A Shaikh
(74) *Attorney, Agent, or Firm* — Carlson, Gaskey & Olds, P.C.

(57) ABSTRACT

An adjustment and temperature limit assembly for a mixing cartridge includes a first piece and a second piece selectively moveable relative to the first piece. The first piece is configured to be attached to a mixing cartridge housing and includes an abutment defining a maximum temperature limit for water exiting the mixing cartridge. The second piece is configured for attachment to a rotating stem extending outwardly of the housing. The second piece is selectively movable relative to the first piece between a plurality of temperature limits that are less than or equal to the maximum temperature limit. A fixing element is configured to be selectively attached to at least one of the first and second pieces to fix an operating temperature at one of the plurality of temperature limits or to set a reduced maximum temperature limit that is less than the maximum temperature limit.

32 Claims, 4 Drawing Sheets

(56) References Cited

U.S. PATENT DOCUMENTS

| | | | |
|---|---|---|---|
| 6,758,242 B2 * | 7/2004 | Jones .................... | F16K 31/605 137/625.41 |
| 2015/0041698 A1 * | 2/2015 | Martinez ................. | F16K 1/523 251/288 |

* cited by examiner

CARTRIDGE TEMPERATURE LIMIT CONTROL MECHANISM

BACKGROUND OF THE INVENTION

The present invention generally relates to a temperature limit control mechanism for a mixing cartridge.

A mixing cartridge provides an output of mixed water from separate hot and cold water inputs. In order to avoid an output of scalding hot water, these cartridges are subject to certain standards. For example, American Society of Sanitary Engineering (ASSE) 1070 sets forth the performance requirements for water temperature limiting devices. To meet this standard, the mixing cartridges are typically configured to set a maximum temperature output level that cannot be exceeded. However, an end user may prefer to have a lower maximum temperature or may want to be able to adjust the output temperature dependent upon the type of application in which the mixing cartridge is being used. As such, manufacturers are continually seeking to improve water temperature limiting devices to address end user comfort.

SUMMARY OF THE INVENTION

According to one exemplary embodiment, an adjustment and temperature limit assembly for a mixing cartridge includes a first piece and a second piece selectively moveable relative to the first piece. The first piece is configured to be attached to a mixing cartridge housing and includes an abutment defining a maximum temperature limit for water exiting the mixing cartridge. The second piece is configured for attachment to a rotating stem extending outwardly of the housing. The second piece is selectively movable relative to the first piece between a plurality of temperature limits that are less than or equal to the maximum temperature limit. A fixing element is configured to be selectively attached to at least one of the first and second pieces to fix an operating temperature at one of the plurality of temperature limits or to set a reduced maximum temperature limit that is less than the maximum temperature limit.

In another embodiment according to any other disclosed embodiment, the maximum temperature limit is based on a discomfort water temperature for a user.

In another embodiment according to any other disclosed embodiment, the first piece comprises a sleeve that defines a central axis, and wherein the sleeve is configured to be fixed to a cartridge housing via the first mixing cartridge attachment interface.

In another embodiment according to any other disclosed embodiment, the sleeve includes a first end face facing the housing and a second end face facing opposite the first end face, and wherein the abutment comprises a protruding portion extending outwardly from the second end face to define a rotational limit of the mixing cartridge, and wherein the second piece contacts the abutment at the maximum temperature limit. Optionally, the protruding portion in one piece can be replaced by a recess in an alternate embodiment with the other piece including a feature to cooperate with the recess to prevent rotation beyond the maximum temperature limit.

In another embodiment according to any other disclosed embodiment, the second end face includes a plurality of stop features to define the plurality of temperature limits.

In another embodiment according to any other disclosed embodiment, the stop features comprise a plurality of discrete openings in the second end face that are circumferentially spaced apart from each other.

In another embodiment according to any other disclosed embodiment, the second piece is configured to be mounted for movement with a rotating stem of the mixing cartridge via the second mixing attachment interface, the second piece including a radial extension that abuts against the protruding portion of the first piece to define the maximum temperature limit.

In another embodiment according to any other disclosed embodiment, the radial extension includes a lock feature that is selectively alignable with one stop feature of the plurality of stop features, and wherein the fastening element cooperates with the lock feature and the one stop feature to fix the operating temperature at one of the plurality of temperature limits.

In another embodiment according to any other disclosed embodiment, the fastening element is selectively associated with one stop feature of the plurality of stop features, and wherein an abutment surface on the radial extension abuts against the fastening element to set a desired reduced maximum temperature limit that is less than the maximum temperature limit.

In another embodiment according to any other disclosed embodiment, the plurality of stop features comprises a plurality of openings formed in the first piece and wherein the fastening element comprises a pin that is positioned to protrude outwardly of one of the openings.

In another embodiment according to any other disclosed embodiment, one of the first and second pieces includes a cold stop feature comprising another protruding abutment or an additional fixing element that serves to limit rotation of the stem of the mixing cartridge below a minimum temperature.

According to another exemplary embodiment, a method of setting a maximum temperature limit for a mixing cartridge comprises the steps of mounting a first piece to a mixing cartridge housing, the first piece including an abutment defining a maximum temperature limit for water exiting the mixing cartridge, mounting a second piece on a rotatable stem extending outwardly of the mixing cartridge housing, the second piece selectively movable relative to the first piece between a plurality of temperature limits that are less than or equal to the maximum temperature limit, and selectively attaching a fixing element to at least one of the first and second pieces to fix an operating temperature at one of the plurality of temperature limits or to set a reduced maximum temperature limit that is less than the maximum temperature limit.

These and other features of the present invention can be best understood from the following specification and drawings, the following of which is a brief description.

DETAILED DESCRIPTION

Figure 1:
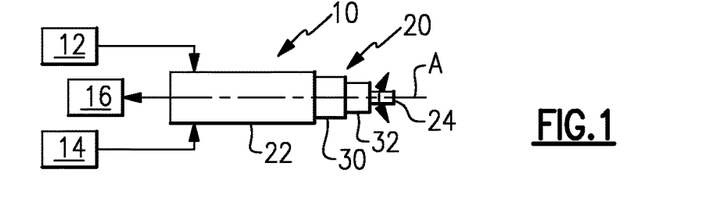
FIG. 1 shows a schematic representation of a mixing cartridge with an adjustment and temperature limit assembly.

FIG. 1 shows a thermostatic mixing cartridge 10 having a cold water inlet 12, a hot water inlet 14, and one or more mixed water outlets 16. An adjustment and temperature limit assembly 20 is used to fix or set a range of output temperatures on an associated faucet (not shown) by controlling a mixing ratio of the thermostatic mixing cartridge 10. The operation of the mixing cartridge itself is well-known. In one example, the mixing cartridge 10 includes a thermostatic element and is used in an electronic faucet; however, the subject adjustment and temperature limit assembly 20 can be used with any type of mixing cartridge.

The mixing cartridge includes a housing 22 and a stem 24 that extends outwardly of the housing 22. The stem 24 is rotatable relative to the housing 22 about an axis A. The rotational angle of the stem 24 controls the mixing ratio of hot to cold. The adjustment and temperature limit assembly 20 includes a first piece 30 that is fixed to the housing 22 and a second piece 32 that is mounted for rotation with the stem 24. The first piece 30 includes a limit feature that defines a maximum temperature limit for water exiting the mixing cartridge 10, and the second piece 32 is selectively movable relative to the first piece 30 between a plurality of temperature limits that are less than or equal to the maximum temperature limit. This will be discussed in greater detail below.

Figure 2A:
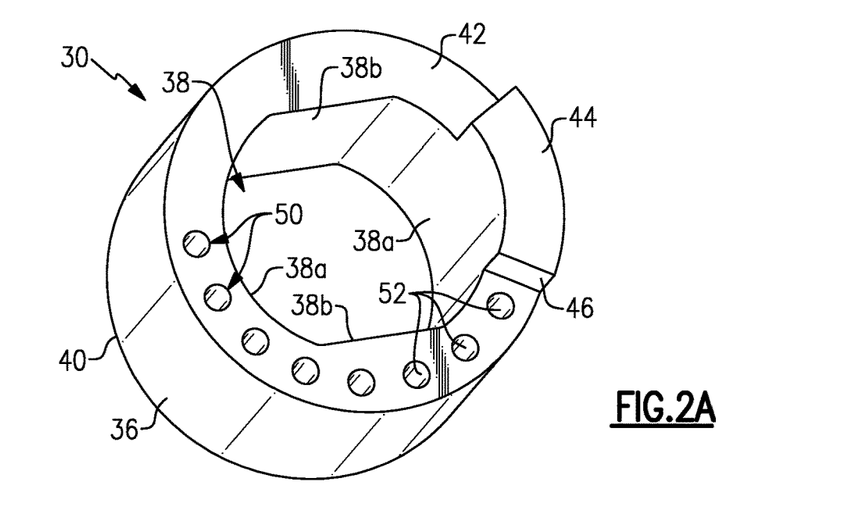
FIG. 2A is a perspective end view of a first piece of the adjustment and temperature limit assembly.
Figure 2B:
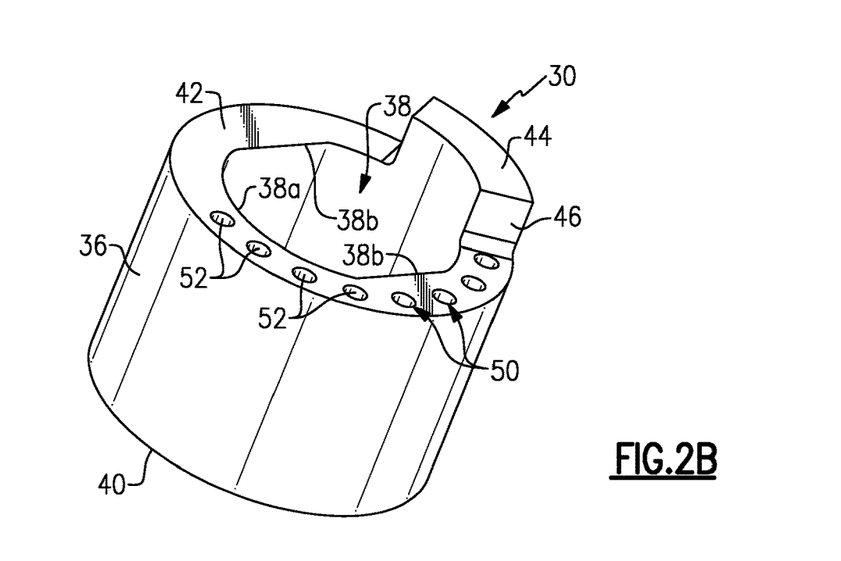
FIG. 2B is a perspective side view of the first piece as shown in FIG. 2A.

The first piece 30 is shown in greater detail in FIGS. 2A-2B. The first piece 30 comprises a sleeve 36 with a center bore 38 through which the stem 24 extends. The sleeve 36 includes a first end face 40 facing the housing 22 and a second end face 42 facing opposite the first end face 40.

The sleeve 36 is mounted to the housing 22 such that the sleeve 36 does not rotate relative to the housing 22. Any of various attachment interfaces can be used to mount the sleeve 36 to the housing 22, such as D-flats, splines or fasteners for example. In the example shown in FIGS. 2A-2B, the bore 38 has arcuate portions 38a and flat portions 38b. When the sleeve 36 is slid over the stem 24 the bore 38 surrounds a portion 48 (FIG. 4A) of the housing 22 from which the stem 24 protrudes. The flat portions 38b prevent the sleeve 36 from rotating relative to the housing 22.

A protruding portion 44 extends outwardly from the second end face 42 of the sleeve 36. The protruding portion 44 defines an abutment 46 that defines the maximum temperature limit for water exiting the mixing cartridge 10. Thus, when the stem 24 is rotated to adjust the output temperature, the second piece 32 contacts the abutment 46 at the maximum temperature limit and prevents further rotation that would result in the temperature exceeding the maximum temperature limit. In one example, the maximum temperature limit is 120 degrees Fahrenheit, which is in accordance with ASSE 1070.

The second end face 42 also includes a plurality of stop features 50 to define a plurality of additional temperature limits. These additional temperature limits are less than the maximum temperature limit defined by the abutment 46. The second piece 32 is selectively rotatable relative to the first piece 30 to fix an operating temperature at one of the plurality of temperature limits or to set a reduced maximum temperature limit that is less than the maximum temperature limit.

In one example, the stop features 50 comprise a plurality of discrete openings 52 formed in the second end face 42 that are circumferentially spaced apart from each other about the axis A. Each opening 52 defines a reduced temperature limit that is less than the maximum temperature limit. In one example, there are eight openings 52 that are each spaced apart from each other by approximately 20 degrees to define five degree Fahrenheit intervals to allow adjustment down to 80 degrees Fahrenheit; however, fewer or more openings could be utilized and/or various degrees of spacings could be contemplated.

Figure 3:
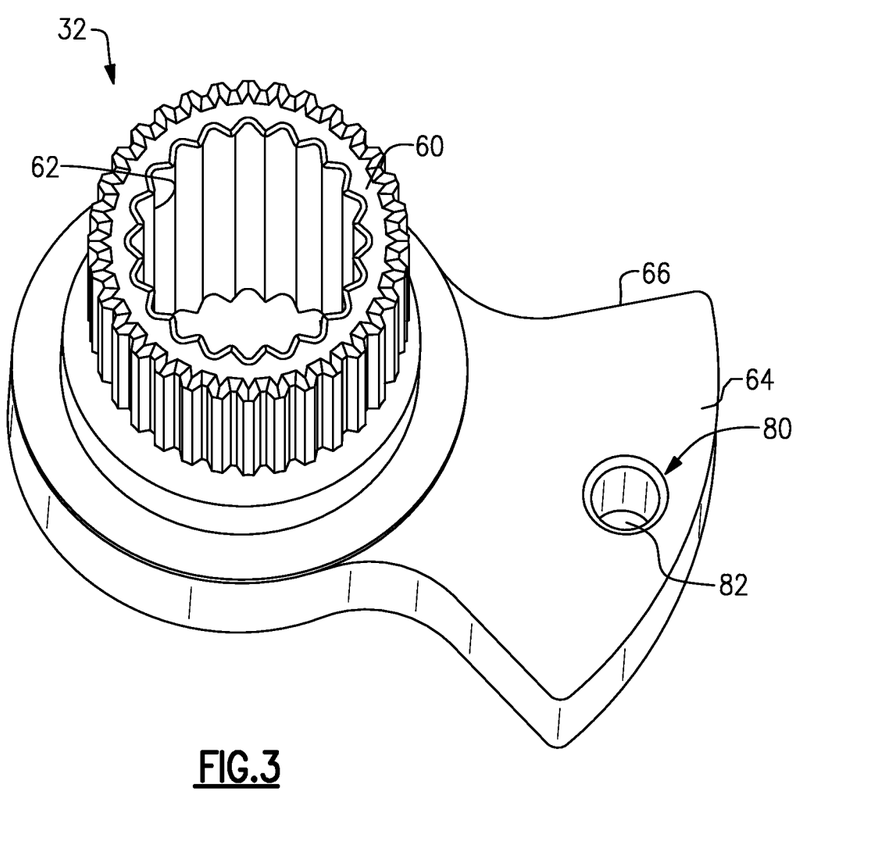
FIG. 3 is a perspective end view of a second piece of the adjustment and temperature limit assembly.

As shown in FIG. 3, the second piece 32 includes a center hub 60 with a bore 62 that is fit over the stem 24. In the example shown, the bore 62 comprises a splined surface that mates with corresponding splines on the stem 24 such that the stem 24 and second piece 32 rotate together. While a splined attachment interface between the second piece 32 and the stem 24 is shown, other attachment interfaces could also be used.

The second piece 32 includes a radial extension 64 that extends outwardly from the hub 60 and abuts against the protruding portion 44 of the first piece 30 to define a stop at the maximum temperature limit. In the example shown, the radial extension 64 comprises a wedge with an abutment surface 66 that contacts the abutment 46 of the first piece 30 to prevent exceeding the maximum temperature limit.

Optionally, the protruding portion 44 in one piece can be replaced by a recess in an alternate embodiment with the other piece including a feature to cooperate with the recess to prevent rotation beyond the maximum temperature limit.

Figure 4A:
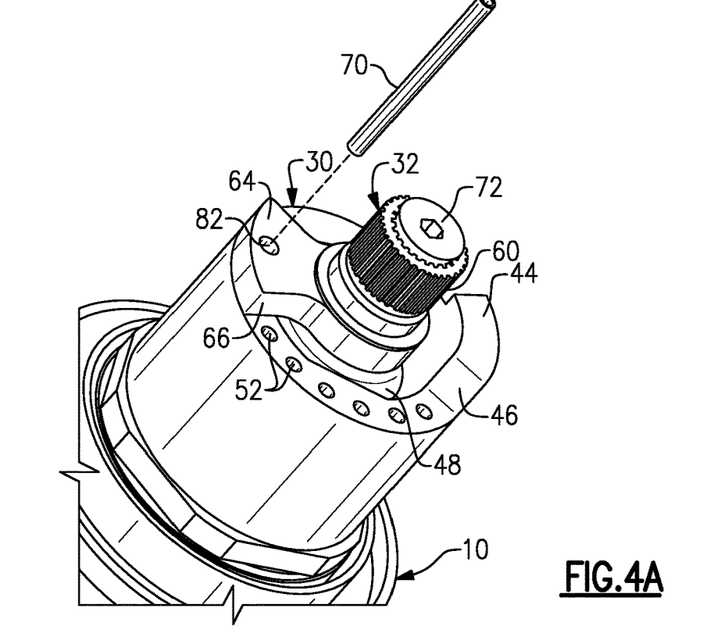
FIG. 4A is a perspective end view showing a first embodiment of the adjustment and temperature limit assembly in an initial assembled configuration.
Figure 4B:
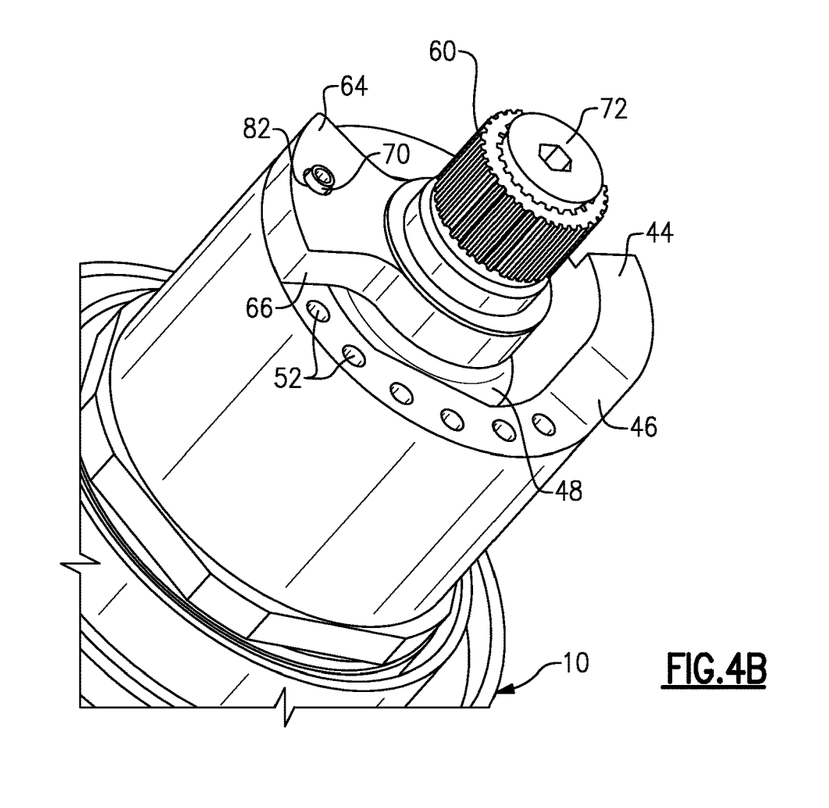
FIG. 4B is a view similar to FIG. 4A but showing a final assembled configuration.
Figure 5A:
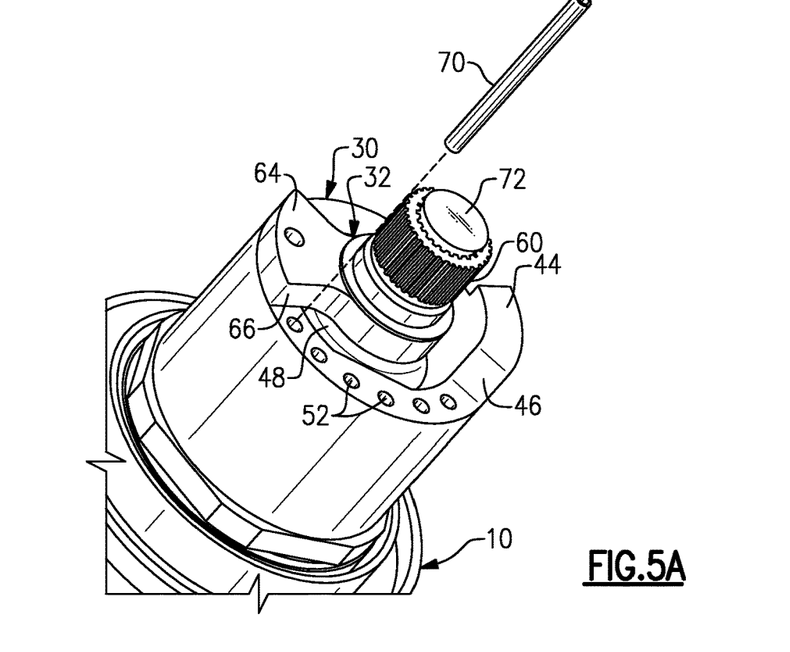
FIG. 5A is a perspective end view showing a second embodiment of the adjustment and temperature limit assembly in an initial assembled configuration.
Figure 5B:
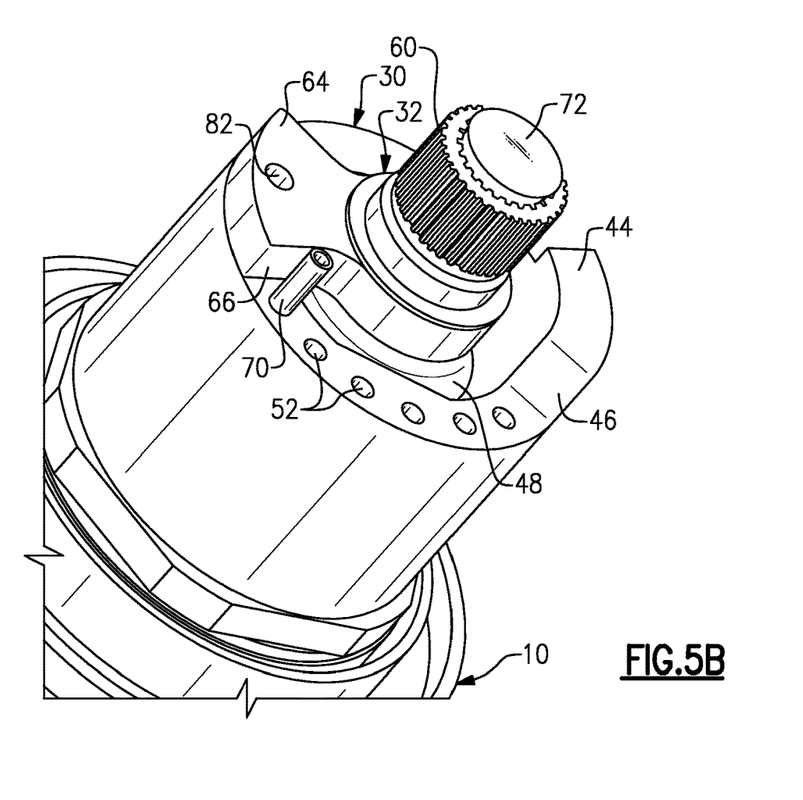
FIG. 5B is a view similar to FIG. 5A but showing a final assembled configuration.

The subject adjustment and temperature limit assembly 20 is configured to provide at least two different modes of operation. FIGS. 4A-4B show a fixed style of operation where a user can fix the assembly 20 at a set temperature setting that will not vary. FIGS. 5A-5B show a comfort style of operation where the user can reduce the maximum temperature limit but still have adjustment to cold. A fastening or fixing element 70 is configured to be selectively attached to one of the first 30 and/or second 32 pieces to achieve the desired mode of operation.

The operation of the adjustment and temperature limit assembly 20 is as follows. The first 30 and second 32 pieces are installed on the mixing cartridge 10. The abutment 46 defines the maximum temperature limit. A tamper-proof screw or other fastener 72 is installed on the cartridge 10 to prevent the second piece 32 from being removed from (or rotated relative to) the first piece 30. Thus, the maximum temperature limit is set at the factory and cannot be changed.

To achieve the fixed style of operation shown in FIGS. 4A-4B, the fixing element 70 is used to lock the assembly 20 at a specific reduced maximum temperature. The radial extension 64 includes a lock feature 80 that is selectively alignable with one stop feature 50 of the first piece 30. In the example shown, the lock feature comprises a bore 82 that extends through a thickness of the radial extension 64. The bore 82 is aligned with one of the plurality of openings 52 and the fastening element 70 is inserted through the bore 82 and opening 52 to prevent the second piece 32 from rotating relative to the first piece 30. This fixes the operating temperature at the selected one of the plurality of temperature limits.

In one example, the fastening element 70 comprises a roll pin; however, other connecting/fastening features or structures could also be used to prevent relative rotation between the first 30 and second 32 pieces. An end portion of the fastening element 70 protrudes outwardly of the bore 82 such that the fastening element 70 can be selectively removed for further adjustment as needed.

In one example, the openings 52 are sized at approximately 0.0795 inches to accommodate a ⁵⁄₆₄ inch roll pin. Further, the bore 82 is approximately sized at 0.0830 inches, which is slightly larger than the size of openings 52. This facilitates easy insertion of the pin through the aligned bore 82 and opening 52.

In one example, the position of the second piece 32 can be adjusted such that it is fixed at the maximum temperature limit as defined by the abutment 46. To achieve this operating condition, the second piece 32 is rotated until the abutment surface 66 contacts the abutment 46 on the protruding portion 44. The fastening element 70 is then installed in one of the openings 52 positioned immediately adjacent the radial extension 64 on a side opposite of the abutment surface 66.

To achieve the comfort style of operation shown in FIGS. 5A-5B, the fastening element 70 is not inserted through the bore 82 of the radial extension 64. Instead, the fastening element 70 is inserted directly into one of the openings 52 in the first piece 30. The user rotates the second piece 32 to the desired position adjacent a selected one of the openings and then the fastening element 70 is inserted into the selected opening 52. The abutment surface 66 on the radial extension 64 then abuts against the fastening element 70 to set the desired reduced maximum temperature limit to a level that is less than the maximum factory temperature limit. However, in this configuration, there is still a capability to adjust to cold as needed. Further, as discussed above, the fastening element 70 protrudes outwardly from the opening 52 such that the fastening element 70 can be removed for further adjustment as needed.

Optionally, the fastening element can be positioned on an opposite side of the radial extension 64 to provide a cold limit stop and set a minimum temperature to be maintained. Further, while only one fastening element is shown 70, it should be understood that an additional fastening element 70 could be used to define a range of temperatures, i.e. minimum temperature to maximum temperature range, with the radial extension 64 being located between the pair of fastening elements 70.

The subject invention provides a device that permits a maximum hot water temperature to be set at the factory to the ASSE 1070 standard to prevent scalding, while providing an additional end user adjustability below the maximum temperature to a desired maximum comfort temperature. Thus, the device can be sold as a certified repair part that will not exceed the standard. The device can also be used to lock the output temperature to a desired single set point if outlet water temperature variation is not required, or can be used to limit the minimum mixed temperature.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. An adjustment and temperature limit assembly for a mixing cartridge comprising:
   a first piece including a first mixing cartridge attachment interface, the first piece including an abutment defining a maximum temperature limit for water exiting the mixing cartridge via an outlet;
   a second piece including a second mixing cartridge attachment interface, the second piece selectively movable relative to the first piece between a plurality of temperature limits that are less than or equal to the maximum temperature limit; and
   a fixing element selectively fixed to at least the first piece such that the fixing element does not move relative to the first piece and does not rotate with the second piece, and wherein the fixing element is selectively removed from the first piece for adjustment as needed such that the fixing element can be set to fix an operating temperature exiting the outlet at one of the plurality of temperature limits and wherein the fixing element can set a reduced maximum temperature limit that is less than the maximum temperature limit and/or can set a minimum temperature limit.

2. The adjustment and temperature limit assembly according to claim 1 wherein the maximum temperature limit is factory set by using a tamper-proof fastener or screw that prevents the second piece from being removed from the first piece, and wherein the second piece includes an extension that abuts against the abutment of the first piece at the maximum temperature limit, and wherein the fixing element is used to set a reduced maximum temperature limit that is less than the maximum temperature limit, and wherein the fixing element can fix an operating temperature of water exiting the outlet to a single temperature that is set at the reduced maximum temperature limit or sets an operating temperature range of water exiting the outlet that can vary from a minimum operating temperature up to the reduced maximum temperature limit.

3. The adjustment and temperature limit assembly according to claim 1 wherein the first piece comprises a sleeve that defines a central axis, and wherein the sleeve is configured to be fixed to a cartridge housing via the first mixing cartridge attachment interface, wherein the sleeve includes a first end face facing the housing and a second end face facing opposite the first end face, and wherein the abutment comprises a protruding portion extending outwardly from the second end face to define a rotational limit of the mixing cartridge, and wherein the second piece contacts the abutment at the maximum temperature limit.

4. The adjustment and temperature limit assembly according to claim 3 wherein the second end face includes a plurality of stops that cooperate with the fixing element to define the plurality of temperature limits.

5. The adjustment and temperature limit assembly according to claim 4 wherein the stops comprise a plurality of discrete openings in the second end face that are circumferentially spaced apart from each other.

6. The adjustment and temperature limit assembly according to claim 4 wherein the second piece is configured to be mounted for movement with a rotating stem of the mixing cartridge via the second mixing cartridge attachment interface, the second piece including a radial extension that abuts against the protruding portion of the first piece to define the maximum temperature limit and/or to define the minimum temperature limit.

7. The adjustment and temperature limit assembly according to claim 6 wherein the radial extension includes a lock that is selectively alignable with one stop of the plurality of stops, and wherein the fixing element cooperates with the lock and the one stop to fix the operating temperature at one of the plurality of temperature limits.

8. The adjustment and temperature limit assembly according to claim 6 wherein the fixing element is selectively associated with one stop, and wherein an abutment surface on one side of the radial extension abuts against the fixing element to set a desired reduced maximum temperature limit that is less than the maximum temperature limit and an opposite side of the radial extension comprises an abutment to set the minimum temperature limit.

9. The adjustment and temperature limit assembly according to claim 8 wherein the plurality of stops comprises a plurality of openings formed in the first piece and wherein the fixing element comprises a pin that is positioned to protrude outwardly of one of the openings.

10. A mixing cartridge assembly comprising:
a housing;
a stem extending outwardly of the housing wherein the stem is rotatable relative to the housing;
a first piece fixed to the housing, the first piece including an abutment defining a maximum temperature limit for water exiting the mixing cartridge via an outlet;
a second piece that rotates with the stem, the second piece selectively movable relative to the first piece between a plurality of temperature limits that are less than or equal to the maximum temperature limit; and
a fixing element selectively fixed to at least the first piece such that the fixing element does not move relative to the first piece and does not rotate with the second piece, and wherein the fixing element is selectively removable from the first piece for adjustment as needed such that the fixing element can be set to fix an operating temperature exiting the outlet at one of the plurality of temperature limits and wherein the fixing element can set a reduced maximum temperature limit that is less than the maximum temperature limit and/or can set a minimum temperature limit.

11. The mixing cartridge assembly according to claim 10 wherein the second piece has a first set of splines and the stem has a second set of splines that mate with the first set of splines, and including a tamper-proof fastener or screw to prevent the first and second pieces from being separated from each other, and wherein the second piece includes an extension that abuts against the abutment of the first piece at the factory set for the maximum temperature limit.

12. The mixing cartridge assembly according to claim 11 wherein the first piece comprises a sleeve that defines a central axis, and wherein the sleeve includes a first end face facing the housing and a second end face facing opposite the first end face, and wherein the abutment comprises a protruding portion extending outwardly from the second end face, and wherein the extension of the second piece contacts the abutment at the maximum temperature limit, and wherein the extension is prevented from contacting the abutment by the fixing element when the reduced maximum temperature limit that is less than the maximum temperature limit is set.

13. The mixing cartridge assembly according to claim 12 wherein the second end face includes a plurality of stops that cooperate with the fixing element to define the plurality of temperature limits, and wherein the stops comprise a plurality of discrete openings in the second end face that are circumferentially spaced apart from each other.

14. The mixing cartridge assembly according to claim 12 wherein the second piece includes a center hub that is fit over the stem and wherein the extension comprises a radial extension that extends outwardly from the hub and abuts against the protruding portion of the first piece to define the maximum temperature limit.

15. The mixing cartridge assembly according to claim 14 wherein the radial extension includes a lock that is selectively alignable with one stop of the plurality of stops, and wherein the fixing element cooperates with the lock and the one stop to fix the operating temperature at one of the plurality of temperature limits.

16. The mixing cartridge assembly according to claim 14 wherein the fixing element is selectively associated with one stop, and wherein an abutment surface on one side of the radial extension abuts against the fixing element to set a desired reduced maximum temperature limit that is less than the maximum temperature limit and an opposite side of the radial extension comprises an abutment to set the minimum temperature limit.

17. The mixing cartridge assembly according to claim 16 wherein the plurality of stops comprises a plurality of openings formed in the first piece and wherein the fixing element comprises a pin that is positioned to protrude outwardly of one of the openings.

18. The mixing cartridge assembly according to claim 10 wherein one of the first and second pieces includes a cold stop comprising another protruding abutment or an additional fixing element that serves to limit rotation of the stem below a minimum temperature.

19. A method of setting a maximum temperature limit for a mixing cartridge comprising the steps of:
(a) mounting a first piece to a mixing cartridge housing, the first piece including an abutment defining a maximum temperature limit for water exiting the mixing cartridge via an outlet;
(b) mounting a second piece on a rotatable stem extending outwardly of the mixing cartridge housing, the second piece selectively movable relative to the first piece between a plurality of temperature limits that are less than or equal to the maximum temperature limit; and
(c) selectively fixing a fixing element to at least the first piece such that the fixing element does not move relative to the first piece and does not rotate with the second piece, and wherein the fixing element is selectively removable from the first piece for adjustment as needed such that the fixing element can be set to fix an operating temperature exiting the outlet at one of the plurality of temperature limits and wherein the fixing element can set a reduced maximum temperature limit that is less than the maximum temperature limit.

20. The method according to claim 19 including forming the second piece with a first set of splines and the rotatable stem with a second set of splines that mate with the first set of splines, and including installing a tamper-proof fastener or screw to fix orientation of the second piece to the rotatable stem to provide a factory set for the maximum temperature limit.

21. The method according to claim 20 including aligning a locking bore on the second piece with a stop bore on the first piece and inserting the fixing element through the stop bore and lock bore to prevent the second piece from rotating relative to the first piece and fix an operating temperature of water exiting the outlet at one temperature limit that does not vary and which is less than the maximum temperature limit.

22. The method according to claim 20 including rotating the second piece to a desired reduced temperature position adjacent a selected one of a plurality of stop bores and then inserting the fixing element into the selected stop bore such that an operating temperature of water exiting the outlet is set at a reduced maximum temperature limit that is less than the maximum temperature limit while providing capability to adjust to cold as needed.

23. The method according to claim 20 including providing the second piece with a radial extension having one side that abuts against the fixing element to define the reduced maximum temperature limit, and including installing a second fixing element into a selected stop bore such that an opposite side of the radial extension abuts against the second fixing element to set a minimum operating temperature of water exiting the outlet.

24. The mixing cartridge assembly according to claim 10 wherein the maximum temperature limit is factory set by using a tamper-proof fastener or screw, and wherein the fixing element is used to set a reduced maximum temperature limit that is less than the maximum temperature limit, and wherein the fixing element can fix an operating temperature of water exiting the outlet to a single temperature that is set at the reduced maximum temperature limit or sets an operating temperature range of water exiting the outlet that can vary from a minimum operating temperature up to the reduced maximum temperature limit.

25. The adjustment and temperature limit assembly according to claim 1 wherein the second piece comprises a hub with an internal bore that has a first set of splines that mate with a second set of splines on a mixing cartridge stem.

26. The adjustment and temperature limit assembly according to claim 25 wherein the first piece includes a plurality of stop bores, and wherein the second piece includes a radial extension extending outwardly from one side of the hub and which includes at least one lock bore, and wherein one lock bore is aligned with one stop bore such that the fixing element is inserted through the stop bore and lock bore to prevent the second piece from rotating relative to the first piece and fix an operating temperature of water exiting the outlet at one temperature limit that does not vary and which is less than the maximum temperature limit.

27. The adjustment and temperature limit assembly according to claim 25 wherein the first piece includes a plurality of stop bores, and wherein the second piece includes a radial extension extending outwardly from one side of the hub, and wherein the second piece is rotated to a desired reduced temperature position adjacent a selected one of the stop bores and such that the fixing element is inserted into the selected stop bore to set an operating temperature of water exiting the outlet at a reduced maximum temperature limit that is less than the maximum temperature limit.

28. The adjustment and temperature limit assembly according to claim 27 wherein one side of the radial extension abuts against the fixing element to define the reduced maximum temperature limit, and including a second fixing element that is received within another selected stop bore such that an opposite side of the radial extension abuts against the second fixing element to set a minimum operating temperature of water exiting the outlet.

29. The mixing cartridge assembly according to claim 10 wherein the second piece has a radial extension having one side that abuts against the fixing element to define the reduced maximum temperature limit, and including a second fixing element positioned on an opposite side of the radial extension such that the opposite side of the radial extension abuts against the second fixing element to set a minimum operating temperature of water exiting the outlet.

30. The adjustment and temperature limit assembly according to claim 1 wherein the first piece is configured to be fixed to a cartridge housing via the first mixing cartridge attachment interface, and wherein the second piece is configured to be mounted for movement with a rotating stem of the mixing cartridge via the second mixing cartridge attachment interface, and wherein the fixing element fixes the second piece to the first piece such that the second piece and rotating stem are prevented from rotating relative to the first piece when the operating temperature of the water exiting the outlet is fixed to only one of the plurality of temperature limits such that the operating temperature of the water exiting the outlet cannot vary during use.

31. The mixing cartridge assembly according to claim 10 wherein the fixing element fixes the second piece to the first piece such that the second piece and stem are prevented from rotating relative to the first piece and housing when the operating temperature of the water exiting the outlet is fixed to only one of the plurality of temperature limits such that the operating temperature of the water exiting the outlet cannot vary during use.

32. The method according to claim 19 including fixing the first piece to the mixing cartridge housing, fixing the second piece to the first piece with the fixing element such that the second piece and rotatable stem are prevented from rotating relative to the first piece and mixing cartridge housing when the operating temperature of the water exiting the outlet is fixed to only one of the plurality of temperature limits such that the operating temperature of the water exiting the outlet cannot vary during use.

* * * * *

UNITED STATES PATENT AND TRADEMARK OFFICE
CERTIFICATE OF CORRECTION

PATENT NO. : 10,816,106 B2  
APPLICATION NO. : 14/580778  
DATED : October 27, 2020  
INVENTOR(S) : Fisher et al.

It is certified that error appears in the above-identified patent and that said Letters Patent is hereby corrected as shown below:

In the Claims

In Claim 15, Column 8, Line 10; replace "claim 14" with --claim 13--

In Claim 16, Column 8, Line 16; replace "claim 14" with --claim 13--

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*